United States Patent [19]
Harris

[11] 4,320,386
[45] Mar. 16, 1982

[54] SELECTION AND POWER RESET CIRCUIT

[75] Inventor: Raymond W. Harris, Evington, Va.

[73] Assignee: General Electric Company, Lynchburg, Va.

[21] Appl. No.: 173,489

[22] Filed: Jul. 30, 1980

[51] Int. Cl.³ .......................... H04Q 9/00; G06F 3/02
[52] U.S. Cl. .......................... 340/825.22; 340/365 S; 365/226; 455/185
[58] Field of Search .................... 340/147 P; 455/185, 455/186; 365/226, 227

[56] References Cited

U.S. PATENT DOCUMENTS

| | | | |
|---|---|---|---|
| 3,894,247 | 7/1975 | De Jong | 307/208 |
| 4,020,467 | 4/1977 | Hashimoto et al. | 340/365 S |
| 4,064,399 | 12/1977 | Muranaka | 340/365 S |
| 4,222,038 | 9/1980 | Magerl | 340/365 S |
| 4,271,404 | 6/1981 | Tanaka | 340/365 S |
| 4,279,020 | 7/1981 | Christian et al. | 365/226 |

*Primary Examiner*—Donald J. Yusko
*Attorney, Agent, or Firm*—James J. Williams

[57] ABSTRACT

A plurality of memory circuits and a microprocessor are used for programming. A circuit is provided for selecting and powering one memory circuit and for resetting the microprocessor each time a new memory circuit is selected. The circuit includes a multicontact switch for selecting the desired memory. During the time the switch is moved from one contact to a desired contact, power is removed from the microprocessor for the needed length of time to reset the microprocessor. When the switch engages the desired selected contact, the selected memory circuit is powered and the microprocessor is reset.

12 Claims, 1 Drawing Figure

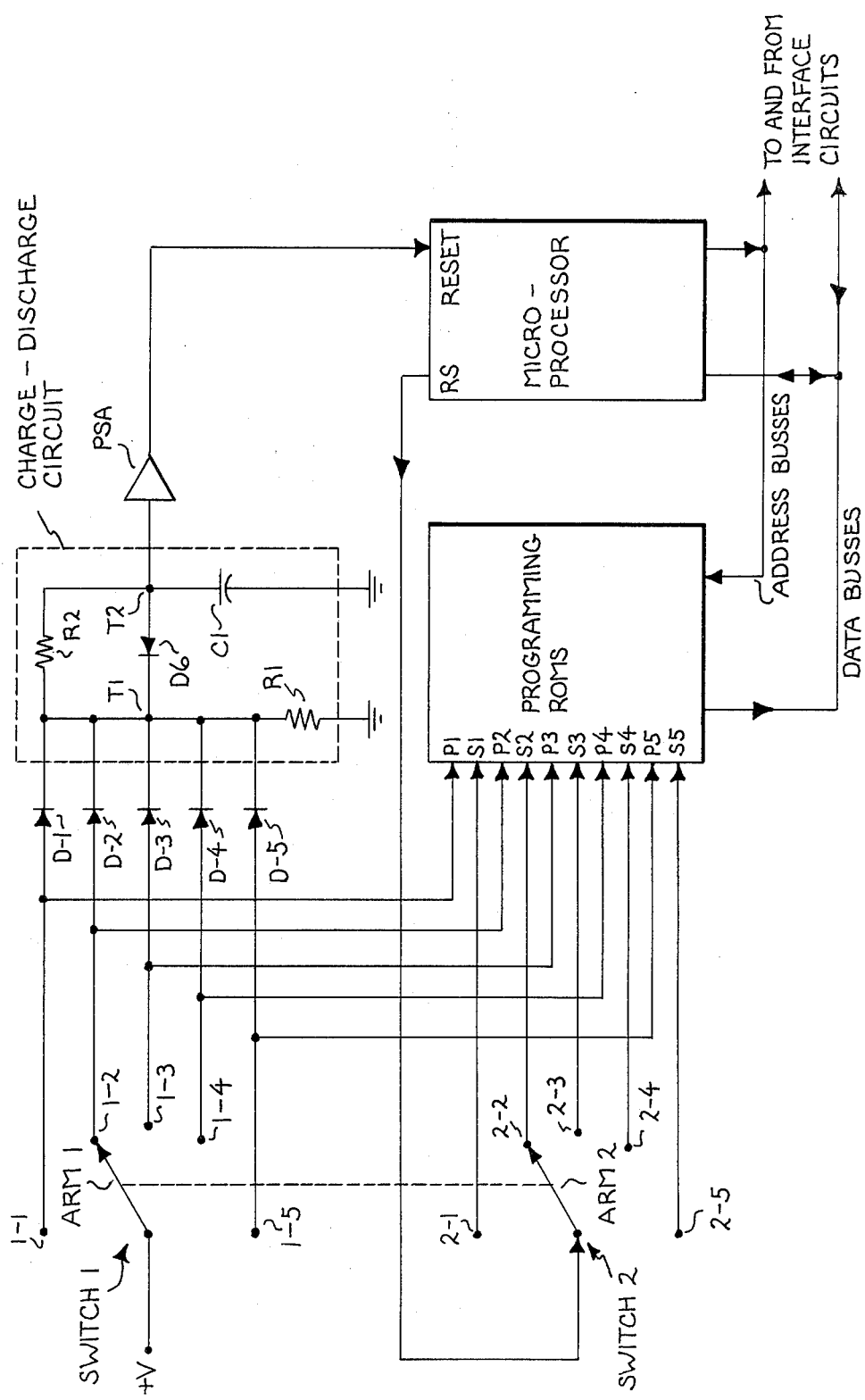

SELECTION AND POWER RESET CIRCUIT

BACKGROUND OF THE INVENTION

My invention relates to a selection and power reset circuit, and particularly to such a circuit for use with a pluralty of programming memories and a microprocessor.

Certain types of electronic devices can be made responsive to a predetermined signal or code. One example of such devices is a paging radio receiver. Such a receiver is carried by a user, and is responsive to a unique signal or code for calling or paging only that particular user. Typically, the unique response is provided by a programmed code plug associated with the receiver. A code plug is an electronic device which has a memory circuit that is permanently programmed to provide the necessary circuit configuration or logic to make the receiver responsive only to a selected code or signal. However, there are various types of code plugs, each of which may require a different type of circuit for programming the code plug.

Accordingly, one object of my invention is to provide a new and improved circuit for operating a plurality of different programming circuits.

Another and more specific object of my invention is to provide a new and improved circuit that supplies power and connects a desired memory circuit to the programming circuit for a code plug to be programmed.

In many programming circuits, a microprocessor is used in connection with memory circuits to effect the programming of the code plug or other device. Accordingly, another object of my invention is to provide a new and improved circuit that selects and powers one desired memory circuit from a plurality of memory ciruits, and that also resets the microprocessor each time a memory circuit is selected.

Where a plurality of memory circuits are provided, the necessary current or power may be large or excessive if all the memory circuits are kept energized. Accordingly, another object of my invention is to provide a new and improved circuit that powers only the one desired memory circuit of a plurality of memory circuits used in association with a microprocessor for programming, thereby saving power.

SUMMARY OF THE INVENTION

Briefly, these and other objects are achieved in accordance with my invention by a circuit having a multi-contact switch for applying power to a selected one of a plurality of memory circuits, and for resetting a microprocessor. The circuit is arranged so that during the time that the switch is moved from one contact to another selected contact, power is removed from the needed length of time, typically several clock cycles, to reset the microprocessor. When the switch engages the desired selected contact, the selected memory circuit is powered and the microprocessor is reset. Thus, I provide a circuit that enables one of a plurality of memory circuits to be selected and that resets a microprocessor each time a memory circuit is selected.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which the single FIGURE shows a preferred embodiment of a selection and power reset circuit in accordance with my invention.

DESCRIPTION OF THE PREFERRED EMBODIMENT

As an example of the application for my invention, I have assumed that programming read only memories (ROMS) and a microprocessor are used to program the code plugs of a paging receiver. As known in the art, the programming ROMS and microprocessor are connected together through address busses and data busses. These busses are also connected to interface circuits (not shown) for providing the actual programming signals to the code plugs. I have also assumed that five programs are needed, but it is to be understood that any plurality of such programs can be provided. Accordingly for the assumed example, there would be five programming ROMS. Each ROM has a ROM selector input S and a power input P followed by a numeral indicating the particular ROM selected and powered. The microprocessor has a reset input which, as is typical, must be reduced to zero for at least two clock cycles when a new programming ROM is selected. After being reset, the microprocessor can then be powered again. The microprocessor also has a ROM selector output RS.

In accordance with my invention, I provide two switches 1 and 2 of the break before make type. Each switch has a respective arm, and five contacts to be engaged by their respective arm. Thus switch 1 has contacts 1-1 through 1-5, and the switch 2 has contacts 2-1 through 2-5. The arms are ganged or coupled together as indicated by the dashed line, so that the arms engage corresponding and respective contacts in any given position. The arm 1 is supplied with a direct current voltage $+V$, and the arm 2 is provided with the ROM selector pulses from the output RS.

With respect to the switch 1, the contacts 1-1 and 1-5 are respectively connected to the power inputs P1 through P5 of the programming ROMS. Each of the contacts 1-1 through 1-5 is also connected to a respective diode D1 through D5, all of which are connected to a first terminal T1 in a charge-discharge circuit shown in dashed lines. These diodes D1 through D5 are poled to conduct current flowing in a first direction from the contacts 1-1 through 1-5 to the first terminal T1. This charge-discharge circuit includes a relatively low magnitude resistor R1 connected between the terminal T1 and a point of reference potential or ground. A relatively high magnitude resistor R2 is connected between the terminal T1 and a second terminal T2. A diode D6 is also connected between the terminals T1 and T2, and is poled to conduct current flowing in a second opposite direction from the terminal T2 to the terminal T1. A time delay capacitor C1 is connected between the terminal T2 and the point of reference potential. Finally, a pulse shaping amplifier PSA is connected between the terminal T2 and the reset input of the microprocessor. This amplifier PSA is arranged to sense the threshold voltage at the terminal T2 and when this threshold is reached, provide a relatively fast rising pulse to reset the microprocessor.

With respect to the switch 2, the contacts 2-1 through 2-5 are respectively connected to the ROM select inputs S1 through S5 of the programming ROMS. The arm 2 is connected to the output RS of the microprocessor.

To explain the operation of my circuit, I have assumed for example that the arms 1 and 2 have been in engagement with their respective contacts 1-2, 2-2 for a relatively long period of time. This permits the voltage +V to supply current in the first direction through the diode D2 and the relatively high resistor R2 to charge the capacitor C1. When the capacitor C1 receives sufficient charge, the pulse shaping amplifier PSA produces a pulse that resets the microprocessor. This causes the microprocessor to produce a ROM selector pulse at its output RS which is supplied through the arm 2 and the contact 2-2 to the selector input S2 of that programming ROM 2. The programming ROM 2 is also energized by power applied from the voltage +V through the contact 1-2 to its power input P2. The programming ROM 2 then begins to function in connection with the microprocessor to provide appropriate signals to and from the interface circuits to program a code plug.

After a code plug has been programmed in connection with the ROM 2, I have then assumed that another type of code plug is to be programmed, and that this new code plug requires the program provided by programming ROM 3. In this case, arms 1 and 2 would be moved to their respective contacts 1-3 and 2-3. As the arm 1 moves from the contact 1-2 to the contact 1-3, there is a short length of time in which no voltage is present on any of the contacts 1-1 through 1-5. During this time, current flows from the capacitor C1 in the second opposite direction through the diode D6 and the relatively small resistor R1 to quickly discharge the capacitor C1 and reduce the voltage at the terminal T2 to substantially zero. This causes the pulse shaping amplifier PSA to produce a zero output which resets the microprocessor. A short time later when the arms 1 and 2 engage their respective contacts 1-3 and 2-3, power is applied to the programming ROM 3 at its power input P3. Current also flows again in the first direction through the diode D3 to the terminal T1 and through the resistor R2 to charge the capacitor C1. When the capacitor C1 reaches a predetermined threshold voltage, the pulse shaping amplifier PSA produces a pulse that completes the reset function of the microprocessor. This causes the microprocessor to produce a pulse at its output RS which is applied to the input S3 to complete selection of the ROM 3. At this time, programming in accordance with the memory of the programming ROM 3 takes place in association with the microprocessor. Similar operations take place for other changes of the switch arms.

It will thus be seen that I have provided a new and relatively simple arrangement which permits programming ROMS to be quickly and individually selected and powered, and at the same time to provide the necessary reset function to the microprocessor. In one embodiment of my invention, the voltage +V was 5 volts, the resistor R1 had a magnitude of 100 ohms, the resistor R2 had a magnitude of 20,000 ohms, and the capacitor C1 had a magnitude of 6.8 microfarads. With this voltage and these circuit values, the reset function was achieved reliably during the relatively short time (in the order of milliseconds) when the arms 1 and 2 were moved from one contact to another contact.

Persons skilled in the art will appreciate that modifications may be made to the one example shown in the FIGURE. For example, any number of contacts may be provided for the switches, and any number of programming ROMs may be provided for these contacts. Likewise, in the charge-discharge circuit, the resistor and capacitor values may be changed to meet desired needs. Various types of switches may be used. And finally, it may not be necessary to provide switch 2 for certain types of programming ROMS, since some ROMS may not require a selector pulse. Therefore, while my invention has been described with reference to a particular embodiment, it is to be understood that modifications may be made without departing from the spirit of the invention or from the scope of the claims.

What I claim as new and desire to secure by Letters Patent of the United States is:

1. An improved selection and power reset circuit for use with a plurality of programming devices each having a respective power input which, when energized, energizes its respective programming device, and for use with a computer device coupled to said programming devices and having a reset input, said selection and power reset circuit comprising:
    a. a programming switch having a power input terminal, and having a plurality of power output terminals for respective connection to said power input terminals of said programming devices, said programming switch selectively connecting its power input terminal to one of its power output terminals;
    b. a time delay capacitor for connection to said power reset input of said computer device;
    c. a charge-discharge circuit having first and second terminals, said second terminal being connected to said time delay capacitor, said charge-discharge circuit providing a relatively high impedance to current flowing between said first and second terminals in a first direction and a relatively low impedance to current flowing between said second and first terminals in a second opposite direction;
    d. and a device respectively connected between each of said power output terminals of said programming switch and said first terminal of said charge-discharge circuit to provide a relatively low impedance to current flowing in said first direction between said output terminals of said programming switch and said first terminal of said charge-discharge circuit;
    e. whereby said time delay capacitor receives a first charge condition in response to power at one of said power output terminals of said programming switch, and receives a second charge condition in response to the relatively short absence of power at all of said power output terminals of said programming switch.

2. The improved power reset circuit of claim 1 wherein each of said devices comprises a diode rectifier poled to provide said relatively low impedance to current flowing in said first direction.

3. The improved power reset circuit of claim 1 or claim 2 wherein said charge-discharge circuit comprises a diode rectifier and resistor connected in parallel between said first terminal and said second terminal, said diode rectifier poled to provide said relatively high impedance to current flowing between said first and second terminals in said first direction, and to provide said relatively low impedance to current flowing between said first and second terminals in said second opposite direction.

4. The improved power reset circuit of claim 1 or claim 2, and further comprising pulse shaping means connected to said time delay capacitor for providing a reset signal to a microprocessor.

5. The improved power reset circuit of claim 3, and further comprising pulse shaping means connected to said time delay capacitor for providing a reset signal to a microprocessor.

6. In a circuit having a plurality of programming memories connected to microprocessor, the improvement comprising:
 a. first switch means having a voltage input and a plurality of outputs, said voltage input being selectively connected to one of said outputs;
 b. means for connecting one of said first switch means outputs to a respective one of said programming memories for supplying power thereto;
 c. a charge-discharge circuit having first and second terminals, a capacitor connected to said second terminal, a relatively slow charging path connected between said first and second terminals, and a relatively fast discharge path including a diode rectifier connected between said first and second terminals;
 d. means for connecting said second terminal of said charge-discharge circuit to said microprocessor;
 e. and diode rectifiers respectively connected between each of said first switch means outputs and said first terminal of said charge-discharge circuit for supplying charging current thereto.

7. In a circuit having a plurality of programming memories connected to a microprocessor, the improvement comprising:
 a. first switch means having a voltage input and a plurality of outputs, said voltage input being selectively connected to one of said outputs;
 b. means for connecting one of said first switch means outputs to a respective one of said programming memories for supplying power thereto;
 c. a charge-discharge circuit having first and second terminals, a capacitor connected to said second terminal, a relatively slow charging path connected between said first and second terminals, and a relatively fast discharge path including a diode rectifier connected between said first and second terminals;
 d. means for connecting said second terminal of said charge-discharge circuit to said microprocessor;
 e. diode rectifiers respectively connected between each of said first switch means outputs and said first terminal of said charge-discharge circuit for supplying charging current thereto;
 f. and second switch means having a memory selector input for connection to said microprocessor and a plurality of outputs for respective connection to said programming memories.

8. An improved programming circuit comprising:
 a. a plurality of programming memories each having a power input and a selector input;
 b. a microprocessor having a reset input and a selector output;
 c. first and second switch means each having an input and a plurality of outputs selectively connected to their respective input;
 d. means for supplying power to said first switch means input;
 e. diode rectifier means poled in a first direction and respectively connecting each of said first switch means outputs to a first terminal;
 f. a relatively low magnitude discharge resistor connected to said first terminal;
 g. a capacitor connected to a second terminal;
 h. a relatively high magnitude charging resistor connected between said first and second terminals;
 i. diode rectifier means poled in a second opposite direction and connected between said first and second terminals;
 j. means connecting said second terminal to said reset input of said microprocessor;
 k. means connecting each of said first switch means outputs to a respective one of said power inputs of said programming memories;
 l. means connecting said second switch means input to said selector output of said microprocessor;
 m. and means connecting each of said second switch means outputs to a respective one of said selector inputs of said programming memories.

9. The improved programming circuit of claim 8 wherein said first and second switch means are coupled together for selectively engaging corresponding respective outputs.

10. The improved programming circuit of claim 8 or claim 9 wherein said first switch means are the break before make type.

11. The improved programming circuit of claim 8 or claim 9 wherein said means connecting said second terminal to said reset input of said microprocessor comprise a pulse shaper.

12. The improved programming circuit of claim 10 wherein said means connecting said second terminal to said reset input of said microprocessor comprise a pulse shaper.

* * * * *